(12) United States Patent
Ouellet et al.

(10) Patent No.: US 11,732,812 B1
(45) Date of Patent: Aug. 22, 2023

(54) BALL VALVE WITH INTEGRAL SEAL RETRACTION

(71) Applicant: Blue Origin LLC, Kent, WA (US)

(72) Inventors: Andrew T. Ouellet, Kent, WA (US); Kevin A. Westhoff, Kent, WA (US); Tyler J. Baker, Kent, WA (US)

(73) Assignee: Blue Origin LLC, Kent, WA (US)

( * ) Notice: Subject to any disclaimer, the term of this patent is extended or adjusted under 35 U.S.C. 154(b) by 0 days.

(21) Appl. No.: 17/823,867

(22) Filed: Aug. 31, 2022

Related U.S. Application Data (63) Continuation of application No. 17/026,876, filed on Sep. 21, 2020, now Pat. No. 11,460,117.

(51) Int. Cl.
  *F16K 5/06* (2006.01)
  *F16K 5/20* (2006.01)

(52) U.S. Cl.
  CPC .......... *F16K 5/0689* (2013.01); *F16K 5/0605* (2013.01); *F16K 5/0684* (2013.01); *F16K 5/204* (2013.01); *Y10T 137/0508* (2015.04)

(58) Field of Classification Search
  CPC .... F16K 5/0689; F16K 5/0605; F16K 5/0684; F16K 5/204; Y10T 137/0508
  USPC .... 251/314–317.1, 315.1–315.16; 137/15.22
  See application file for complete search history.

(56) References Cited

U.S. PATENT DOCUMENTS

| | | | |
|---|---|---|---|
| 3,386,699 A * | 6/1968 | Petter | F16K 5/0626 277/369 |
| 3,410,523 A | 11/1968 | Kelly et al. | |
| 3,484,078 A | 12/1969 | Haenky | |
| 3,512,546 A | 5/1970 | King | |
| 3,926,407 A | 12/1975 | Forster et al. | |
| 4,134,595 A * | 1/1979 | Melville | F16K 5/0668 251/315.05 |
| 4,140,149 A | 2/1979 | Laignel et al. | |
| 4,634,098 A | 1/1987 | Varden | |
| 5,305,988 A | 4/1994 | Cox | |
| 5,482,253 A | 1/1996 | Klyde | |
| 6,485,000 B1 | 11/2002 | Klyde et al. | |
| 8,864,105 B2 | 10/2014 | Xu et al. | |
| 2012/0145938 A1 | 6/2012 | Avdjian | |
| 2016/0003004 A1 | 1/2016 | Inglis et al. | |
| 2018/0187514 A1 | 7/2018 | Inglis et al. | |

* cited by examiner

*Primary Examiner* — John Bastianelli
(74) *Attorney, Agent, or Firm* — K&L Gates LLP (57) ABSTRACT

Disclosed embodiments include ball valves with an asymmetric seal and seat, to minimize seal wear. In embodiments, a seal is disposed upon a ball with a first and second section, where the first section of the seal is disposed at a different angle from the second section. A seat has a first and second section at different angles that correspond to angles of the first and second section of the seal, respectively, such that the seal fully contacts the seat when the ball is in a closed position. When the ball is rotated to an open position, the different angles of the first and second sections allow the second section of the seal to clear the first section of the seat without contact.

18 Claims, 8 Drawing Sheets

BALL VALVE WITH INTEGRAL SEAL RETRACTION

CROSS-REFERENCE TO RELATED APPLICATION

This application is a continuation application claiming priority under 35 U.S.C. § 120 to U.S. patent application Ser. No. 17/026,876, entitled BALL VALVE WITH INTEGRAL SEAL RETRACTION, filed Sep. 21, 2020, the entire disclosure of which is hereby incorporated by reference herein.

TECHNICAL FIELD

Embodiments herein relate to the field of fluid control, and more specifically, to a ball valve with a ball and seal arrangement where the seal does not contact the housing of the valve during actuation.

BACKGROUND

Valves are essential devices to control the flow of various fluids in a vast array of applications. The fundamental structure of a basic valve includes a body with inlet port for receiving a fluid, an outlet port for discharging the fluid, and a regulating structure contained within the body for controlling the flow of fluid between the inlet and outlet ports. Valves come in an array of different types, typically based on design aspects such as the method of valve closure, method of actuation, and configuration of the closing mechanism. For example, butterfly valves typically employ a disc structure that is mounted to a shaft, thereby allowing the disc structure to rotate between a closed position, where the disc fully obstructs flow from the inlet port to the outlet port, to an open position, where the disc is oriented to allow full flow from the inlet to the outlet. A handle, disc, lever, or other similar control structure accessible outside of the valve body is mechanically coupled to the closing mechanism (such as the disc structure), to allow the closing mechanism to be manipulated between closed and open positions. Depending upon the valve implementation, the control structure may also allow the valve opening to be sufficiently modulated to control the rate at which fluid flows through the valve.

A ball valve, as the name suggests, utilizes a roughly spherical body with a central passageway that rotates within the valve body. The valve is opened by rotating the ball, via the aforementioned control structure, so that the central passage in the ball aligns with the inlet and outlet ports, thereby allowing fluid to flow into the inlet port, through the central passage, and out from the outlet port. When the ball is rotated to a closed position, the central passage is typically aligned perpendicular to the inlet and outlet ports, with sides of the ball blocking the inlet and outlet ports to prevent fluid flow. Ball valves can provide positive and reliable sealing when closed. The use of a ball as a sealing mechanism can allow a ball valve to effectively control a high-pressure flow. Moreover, because the central passage of a ball valve is typically oriented perpendicular to the fluid flow when the valve is closed, moving the valve to fully open typically requires only a quarter turn of the control structure (assuming no gear reduction is employed). As a result, ball valves may be ideal for use in applications where high-pressure fluid flow must transition rapidly from cut off to a full flow. For purposes of this disclosure, the term "fluid" is intended to include fluids in a liquid phase, gaseous phase, supercritical phase, or a combination of any of the foregoing.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

In the following detailed description, reference is made to the accompanying drawings, which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

When a ball valve is in a closed position, typically only a portion of the ball faces the outlet port. The remainder of the ball, including the central passage, may be exposed to fluid and to any pressure imposed by the stopped flow of the fluid from the inlet port. The area of the remainder of the ball is typically greater than the area facing the outlet port. This asymmetry can result in the ball being biased against the outlet port by the upstream pressure, helping to further seal the valve and prevent any leakage. In a typical ball valve, the outlet port and/or the inlet port may further include a seat that is machined or otherwise formed to fit to the outer surface of the ball, to help improve the valve seal.

This biasing force, in some ball valves, may be sufficient to fully seal the ball from leakage or seepage, particularly where the ball fits closely with the seat. In other ball valves, either the ball, the seat, or both may be equipped with a seal or seals to help improve the integrity of the valve in resisting leaks or seepage. Regardless of whether a seal is present, rotating the ball between open and closed positions typically results in the ball and/or seal (depending on whether the seal is disposed on the ball or on the seat) rubbing against at least the seat, and possibly other portions of the housing interior and inlet port. Over time, this rubbing can result in wear on the seal and/or ball, as well as the seat and/or other components of the housing. This wear can increase the clearance between the ball and the seat/outlet port, and eventually result in leakage. In ball valves that include an elastomeric seal, the seal may be the only component subject to significant wear. Depending upon the ball valve construction, the seal may be a serviceable item that can be replaced, greatly extending the ball valve's life. However, replacing the seal may still impose downtime on the equipment relying upon the ball valve. Thus, minimizing seal wear can minimize downtime and/or reduce the risk of premature seal failure, which may be crucial where the ball valve is employed in critical applications.

Seal wear can be reduced by minimizing the amount of that the seal contacts an opposing surface. A variety of different approaches have been attempted. For example, some ball valves may employ a mechanism that couples to the ball or an attached component that rotates with the ball, such as a valve stem. Rotating the ball away from the closed position simultaneously actuates a mechanism that retracts the seal away from the ball as the ball begins it travel, so that seal contact is minimized. Similarly, while the ball is being rotated back to the closed position, the seal is kept retracted until near the end of the ball's travel, where the retraction mechanism extends the seal as the ball reaches a fully closed position. While such an approach can reduce seal wear, it also introduces a point of failure in the relatively complex retraction mechanism. Depending upon the seal and ball geometry, if the mechanism fails to retract the seal, the ball may be difficult or impossible to move. Similarly, if the mechanism fails to extend the seal, the valve may leak when in a closed position.

Another possible solution involves mounting the ball eccentrically, so that the body of the ball inscribes a circle, rather than the ball rotating about an axis. When combined with a valve housing that has an internal cavity with a radius that is greater than the circle inscribed by the ball, the ball effectively retreats away from the housing interior as it rotates away from a closed position. Thus, the seal has minimal contact with the seat, coming into contact only within the last few degrees of travel to the closed position. However, such a solution requires an oversized interior cavity within the valve housing, which increases both the overall valve size, as well as the valve weight, due to the additional material needed for a larger valve housing. Furthermore, such an arrangement generally prohibits any valve configuration that may have double seals, e.g. a seal and seat around both the inlet and outlet ports.

In any of the foregoing examples, the seals and seats are annular, and planar. Specifically, the seals and seats define a single plane, as is typical in known ball valves. Disclosed embodiments include a ball valve that rotates about an axis, with a seal and seat that are asymmetric in geometry. Specifically, the seal and seat do not lie within a single plane, but have a portion of the seal and seat that is set at a different angle than another portion of the seal and seat. By orienting the leading edge of the seal (defined as the portion of the seal that advances first toward the outlet port as the valve is rotated to the closed position) at a steeper angle relative to the trailing edge of the seal, seal contact against the seat is limited only to the last few degrees of ball travel, minimizing wear. No separate retraction mechanism is needed. Because the ball is positioned to rotate about a center axis, the valve housing can be kept relatively close to the ball, as the space needed to accommodate the travel path of an eccentrically mounted ball is unnecessary. Thus, the valve housing can be kept relatively small, and the risk of failure of a retraction mechanism is eliminated.

Figure 1:
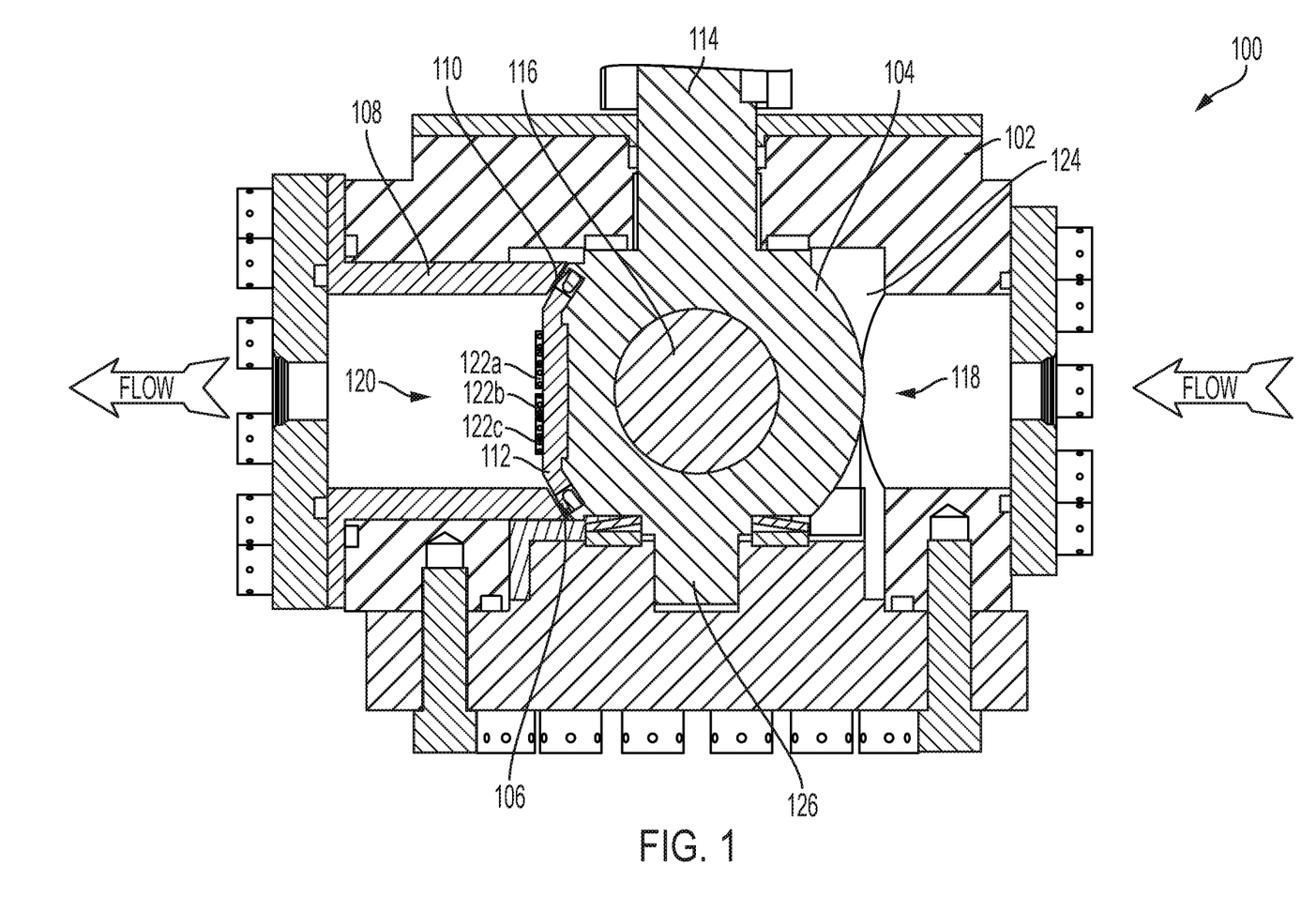
FIG. 1 is a cross-sectional view of an example ball valve with a seal and seal seat configured to minimize contact during valve manipulation, according to various embodiments.

Referring to FIG. 1, a cross-section of an example ball valve 100 according to various embodiments is depicted. Ball valve 100 includes a valve housing 102, and a ball 104 that is positioned within a cavity 124. In the depicted embodiment, a seal 106 is retained to ball 104 with a retainer 112. The seal 106 contacts a seal seat 108 at a mating or seal contact surface 110. The ball 104 is rotated between open and closed positions via a valve stem 114. In the closed position, as depicted in FIG. 1, the seal 106 is in contact with contact surface 110 of seat 108. Rotating the ball 104 to an open position (depicted in FIG. 2, discussed below) aligns a center passage 116 with the inlet port 118 and outlet port 120, thereby allowing a fluid to pass from inlet port 118, through the center passage 116, and out from outlet port 120. The retainer 112, in the depicted embodiment, is retained to the ball 104 via multiple fasteners, including fasteners 122a, 122b, and 122c (collectively or generically, 122).

Housing 102 encloses various components of the ball valve 100, and may provide one or more mounting points for securing ball valve 100 to an adjacent structure. Housing 102 may be implemented as one or more pieces, and may facilitate servicing of valve components, such as by one or more removable sections or access ports. Housing 102 may be manufactured from metal, plastic, composites, or another suitable material or combination of suitable materials. Housing 102 likewise may be manufactured using any suitable technique or techniques appropriate to the materials employed for housing 102, such as casting, forging, machining, or milling.

Within housing 102 a cavity 124 may be formed, for enclosing various operative components of ball valve 100, such as ball 104 and its associated seal 106 and retaining structures. In embodiments, cavity 124 may be sized to closely fit ball 104, with only a minimum of clearance provided between the interior wall of cavity 124 and the exterior surface of ball 104, sufficient to allow ball 104 and its associated structures to rotate with minimal or no contact. Cavity 124 may be formed by milling or machining, such as where housing 102 is formed from a solid billet or billets of material, or may be cast as part of the forming of housing 102. The cavity 124 may further be refined by milling or machining following forming, to bring cavity 124 into close tolerance with ball 104 and its associated structures.

Ball 104 is the moving component of ball valve 100 responsible for fluidly coupling the inlet port 118 to the outlet port 120. Ball 104 is essentially spherical in shape. In embodiments, a valve stem 114 is formed or attached to ball 104 along an axis that passes through the center of ball 104, defining the ball 104's rotational axis. Thus, in the depicted embodiment, the ball 104 does not inscribe a circular path when rotated, but generally symmetrically rotates about the axis defined by valve stem 114. Valve stem 114, in the depicted embodiment, extends along ball 104's axis of rotation, through housing 102, to provide an externally accessible point outside of housing 102 to rotate ball 104 between open and closed positions. Valve stem 114 may also have an extension 126 that extends along the axis rotation distal from valve stem 114 and secures into housing 102, to provide axial stability to ball 104. Valve stem 114 and extension 126 may interface with housing 102 via a suitable bearing. At least for valve stem 114, in the depicted embodiment, the bearing may be sealed to prevent fluid leakage from cavity 124 around valve stem 114.

In some embodiments, such as the depicted embodiment, valve stem 114 can accept an external control, such as a lever or disc, to allow a rotary motion to be imparted to ball 104 to effect opening or closing of ball valve 100. In other embodiments, valve stem 114 may be entirely contained within housing 102, and be actuated by either a mechanical linkage such as a gear train or drive, or may be actuated by a mechanism internal to ball valve 100, such as a hydraulic or electrical actuator. In still other embodiments, valve stem 114 may be omitted, with ball 104 being driven between open and closed positions by a discrete mechanism, such as a gear drive that interfaces with a gear or other suitable means for transfer of rotational force that may be affixed to ball 104. In some such embodiments, extension 126 may be equipped to ball 104, and may be equipped to receive rotational force for driving ball 104 between open and closed positions.

Figure 2:
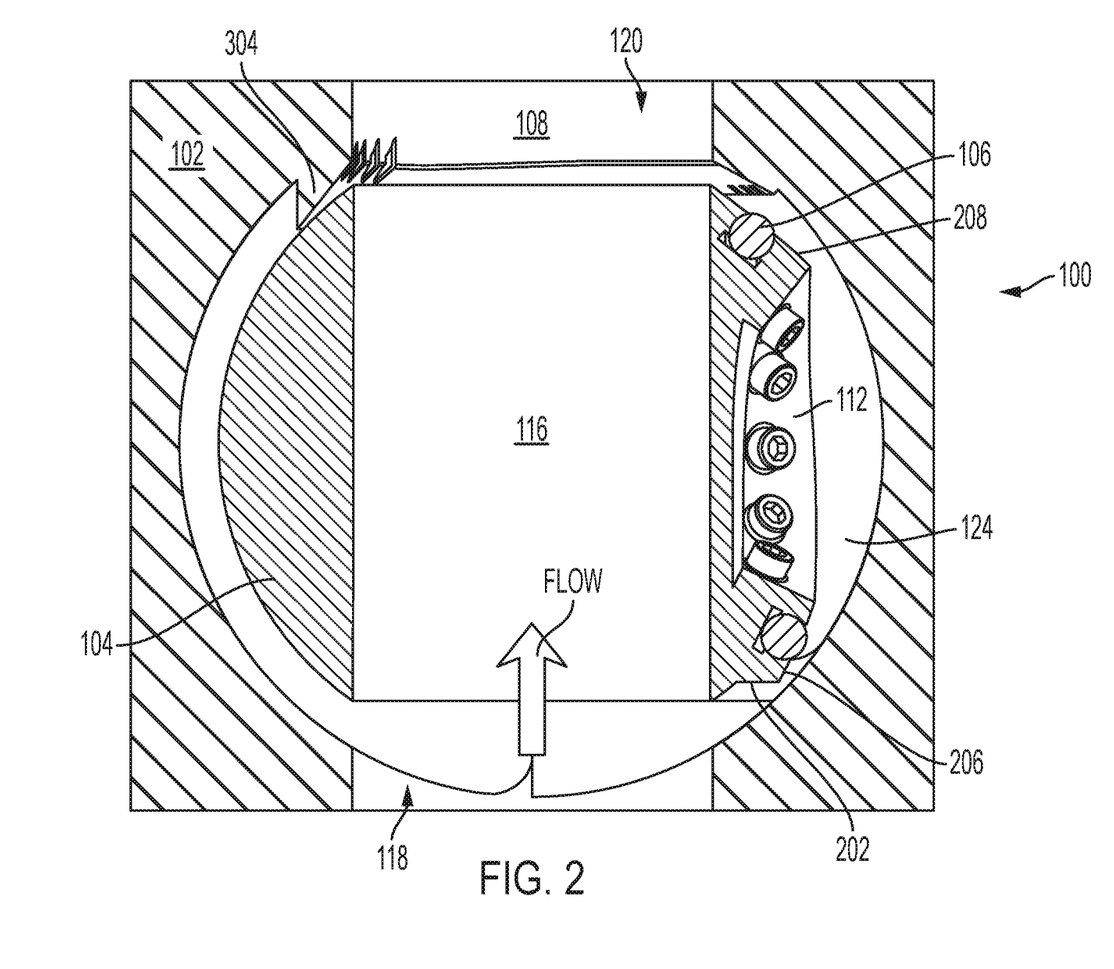
FIG. 2 is a cross-sectional view of the ball and housing of FIG. 1 with the example ball in an open configuration, according to various embodiments.

Referring to FIG. 2, a cross-section view of ball valve 100 in an open configuration, ball 104 further includes a central passageway 116, which acts to fluidly couple inlet port 118 to outlet port 120 when ball 104 is rotated to an open position. Central passageway 116 is a straight, round bore in the embodiments depicted in FIGS. 1 and 2, owing to the positions of inlet port 118 and outlet port 120, which are oriented along a longitudinal axis. In other embodiments, inlet port 118 and outlet port 120 may be offset from each other. In such embodiments, central passageway 116 may be configured with a curve or a bend, as may be necessary to fluidly couple inlet port 118 to outlet port 120. For example, in an embodiment where inlet port 118 and outlet port 120 are oriented at a 90 degree angle, central passageway 116 may be configured as either a 90 degree bend or 90 degree curve. Although depicted as a round bore with approximately the same diameter as inlet port 118 and outlet port 120, it should be understood that central passageway 116 may be of any cross-section and size appropriate for a given implementation. Central passageway 116 need not be of the same cross-section and/or size as either of inlet port 118 or outlet port 120. In some embodiments, central passageway 116 may have a relatively complex interior, as may be necessitated for a given implementation to effect proper control over fluid flow.

Ball 104 may be constructed from any material or materials suitable for a given implementation, such as metal, plastic, ceramic, composites, or any other suitable material. Valve stem 114 and/or extension 126 may be formed as part of, and integral with, ball 104, or may be formed as discrete components that are attached to ball 104. Central passageway 116 may be formed during formation of ball 104, such as where ball 104 is formed via molding, forging, or casting, or may be formed via milling or machining, such as when ball 104 is initially cast or molded as a solid sphere or is formed from a solid billet of material.

In the example embodiments depicted herein, seal 106 is substantially annular in shape. Seal 106 is retained to the surface of ball 104, in embodiments, in a position that causes it to circumscribe outlet port 120 when closed. In the depicted embodiment, seal 106 is oriented to lie approximately parallel to a plane defined by the axis of rotation and a longitudinal axis through central passageway 116. Seal 106 may be retained to the surface of ball 104 via retainer 112. Retainer 112, in turn, may be secured to ball 104 via a plurality of fasteners 122. The use of fasteners 122 to secure retainer 112 to ball 104 can allow seal 106 to be replaced relatively easily during servicing of ball valve 100. In other embodiments, retainer 112 may be integral with seal 106, viz. seal 106 may be a single part that is directly secured to ball 104, such as with one or more fasteners 122, or another suitable retention technique. In some embodiments, seal 106 may cooperate with retaining features on ball 104, to allow seal 106 to be retained in place on ball 104 without the need for a separate retainer 112, or even fasteners 122. Seal 106 and retainer 112 will be discussed in greater detail below.

Figure 3:
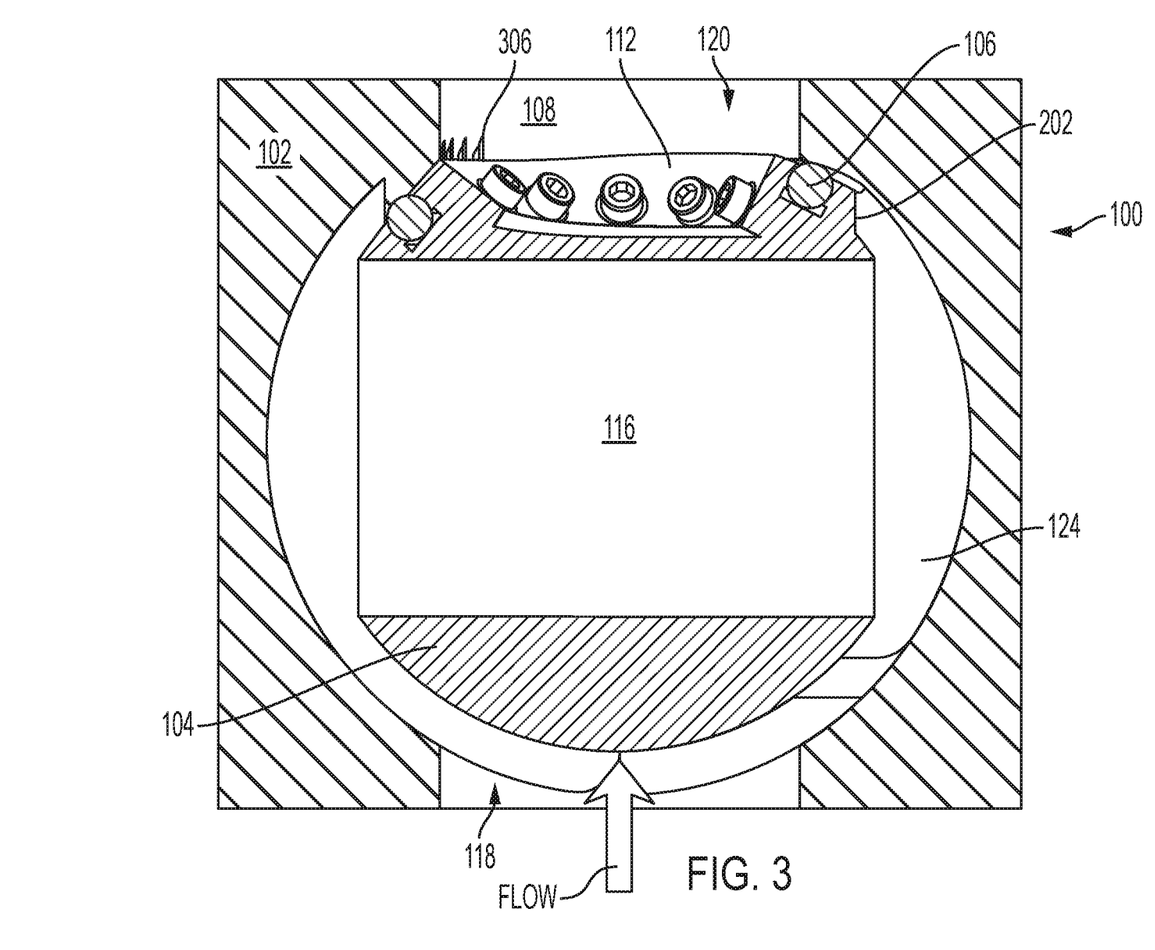
FIG. 3 is a cross-sectional view of the ball and housing of FIG. 1 with the example ball in a closed configuration, according to various embodiments.

As seen in FIG. 1 and in FIG. 3, a cross-sectional view of the ball in a closed position, seal 106 may seal against a valve seat 108, in embodiments. Valve seat 108 may be a separate piece from housing 102 that is fit into place, and is retained via a press-fit, one or more fasteners, and/or one or more retaining devices, depending upon the needs of a given implementation. In other embodiments, valve seat 108 may be integral with, and formed into or from, housing 102, as part of outlet port 120. Seal 106, in the depicted embodiment, contacts valve seat 108 at a contact surface 110. Valve seat 108 will be discussed in greater detail below.

As may be seen in FIGS. 1-3, seat 108 may form at least part of outlet port 120. In the depicted embodiment, seat 108 acts as a liner forming the interior surface of outlet port 120. In the depicted embodiment, inlet port 118 lacks a liner or structure that corresponds to seat 108 for outlet port 120. However, some embodiments of ball valve 100 may include a second seal and seat that circumscribe inlet port 118. In such embodiments, ball 104 may have a seal 106 disposed on either side of central passageway 116, with each seal 106 mating to a seat 108 disposed around the inlet port 118 and outlet port 120, respectively. In such embodiments, materials may be used for seal 106 and/or seat 108 for inlet port 118 that are different from the materials for seal 106 and/or seat 108 for outlet port 120. It should further be understood that, in some embodiments, ball valve 100 may be reverse-oriented so that outlet port 120 acts as inlet port 118, viz. fluid flows into port 120, which becomes an inlet port, and discharges from port 118, which becomes an outlet port, with seal 106 disposed annularly around port 120 as an inlet port.

Fluid flow is indicated by arrows in FIGS. 1-3 (as well as FIGS. 6 and 7, discussed below) corresponding to the inlet port 118 and outlet port 120. When ball valve 100 is closed, inlet port 118 may be subject to a high pressure relative to outlet port 120. In embodiments where ball valve 100 is reverse-oriented, it should be understood that the arrows would be reversed, where outlet port 120 is subject to a high pressure relative to the inlet port 118. In some embodiments, the valve is flow agnostic, e.g. capable of functioning with flow from either direction, and either the inlet port 118 or outlet port 120 being pressurized relative to the other port. In other embodiments, the seal 106 may need to be reconfigured to ensure proper sealing and valve operation in a reverse flow implementation.

Figure 4:
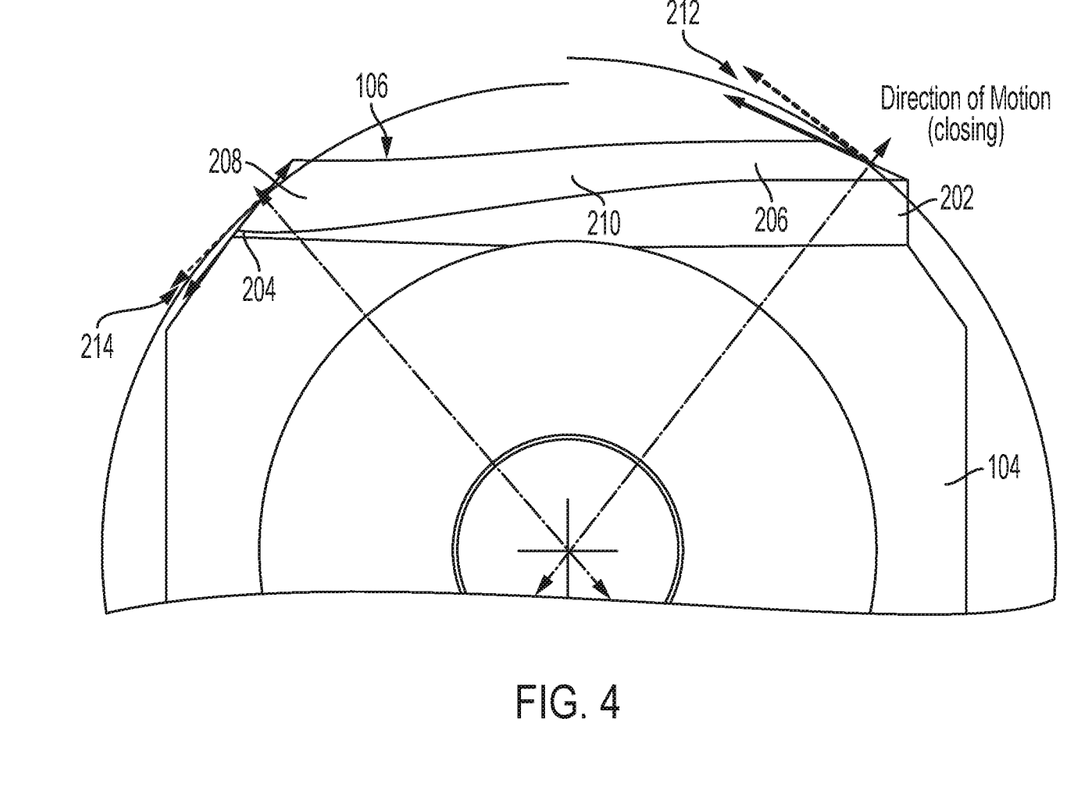
FIG. 4 is a side elevation view of a ball, such as may be used in the example ball valve of FIG. 1, illustrating the seal geometry, according to various embodiments.

FIG. 4 depicts a side profile view of an example embodiment of seal 106 geometry as secured to ball 104. Seal 106, in the depicted embodiment, includes a first section 206 and a second section 208, separated by a transition zone 210. It should be understood that first section 206 and second section 208 each comprise an arcuate portion of seal 106, with each end of the arcuate portions separated by a transition zone 210. Thus, in the depicted embodiment, there are two transition zones 210 diametrically opposed on seal 106. Due to the side elevation view, the second transition zone is not visible. First section 206 of seal 106 may be oriented at a first angle 212 that is acute relative to a radially extending line (indicated in long dashes), and relative to a tangent line defining the direction of travel of an outer point on the spherical surface of ball 104. Second section 208 of seal 106 may be oriented at a second angle 214 that is also acute relative to a radially extending line (indicated in long dashes interspersed with dots), but closer to ninety degrees compared to first angle 212. First angle 212 and second angle 214 define seal path angles for first section 206 and second section 208, respectively. In various embodiments, for both first angle 212 and second angle 214, any angle could be practically implemented, up to and including 90 degrees, depending upon the requirements of a specific implementation, e.g. as dictated by seal and seat geometry and configuration.

In transition zone 210 of the depicted embodiment, the first angle 212 of first section 206 transitions smoothly to the second angle 214 of second section 208. The rate at which the angle transitions, and hence the size of transition zone 210, will depend upon the particulars of a given embodiment. One of the transition zones 210 may differ in size and rate of angular change from the other transition zone 210, in some embodiments. The transition zones 210, in embodiments, maintain a tangential angle as viewed from a top plane around the entire circumference of the sealing face, e.g. the seal 106 and the corresponding angled portions of ball 104 adjacent to seal 106 that mate to seat 108. In some embodiments, first angle 212 and second angle 214 are consistent at all points across the sealing circumference. The change in radius (as viewed from the top) in each transition zone 210 serves to provide a consistent angle at the top and bottom of the sealing face that first angle 212 and second angle 214 may not otherwise provide in those locations. Generally, the more gradual the transition (and larger the transition zone 210), the less the wear to the seal 106 in the transition zone 210, as a more continuous transition (e.g. gradual) minimizes wear by providing all points on the circumferential seal 106 with the same approach angle while minimizing abrupt radii changes of the seal path. Carried to its logical extension, seal 106 and ball 104 may be configured, in some embodiments, with a completely parametric seal path with no distinguishable transition zones, e.g. transition zone 210 essentially spans the entire path of seal 106 about ball 104, such that angle varies continuously between first angle 212 and second angle 214. The amount of the first and second angles 212, 214 and their variance relative to each other may vary depending upon the specifics of a given implementation, such as the size of ball 104 and the diameter of the annular seal 106 relative to the diameter of ball 104.

To ensure that seal 106 both makes complete and sufficient contact with contact surface 110 of seat 108 and likewise clears seat 108 when ball 104 is rotated to an open position, first section 206 and second section 208 of seal 106 are offset from the spherical surface of ball 104. As can be seen in the embodiment depicted in FIG. 2, first section 206 protrudes from the surface of ball 104 via a ridge 202, which extends at an obtuse angle relative to a radial line. Ridge 202 tapers down through transition zone 210, to form a shallow lip 204 in second section 208. It may be observed that seal 106, by virtue of ridge 202 and lip 204, is effectively raised above the spherical surface of ball 104. As may be seen in the embodiment depicted in FIG. 2, both first section 206 and second section 208 approximately bisect an arc defined by the travel path of the direction of motion of ball 104. As lip 204 is lower than ridge 202, second portion 208 lies in a different plane than first portion 206, rendering seal 106 asymmetric. Moreover, the configuration of first section 206, second section 208 at a different angle from first section 206, and intervening transition zone 210, results in a non-planar seal 106 with a slight twist that nevertheless is capable of completely sealing against seat 108 when ball valve 100 is in a closed position.

Seal 106 may be formed with an elastomeric material, and may be of a variety of different cross sections. Seal 106 is disposed upon ball 104 in a relatively complex geometry to minimize wear of seal 106 when ball valve 100 is actuated between open and closed positions.

Figure 5:
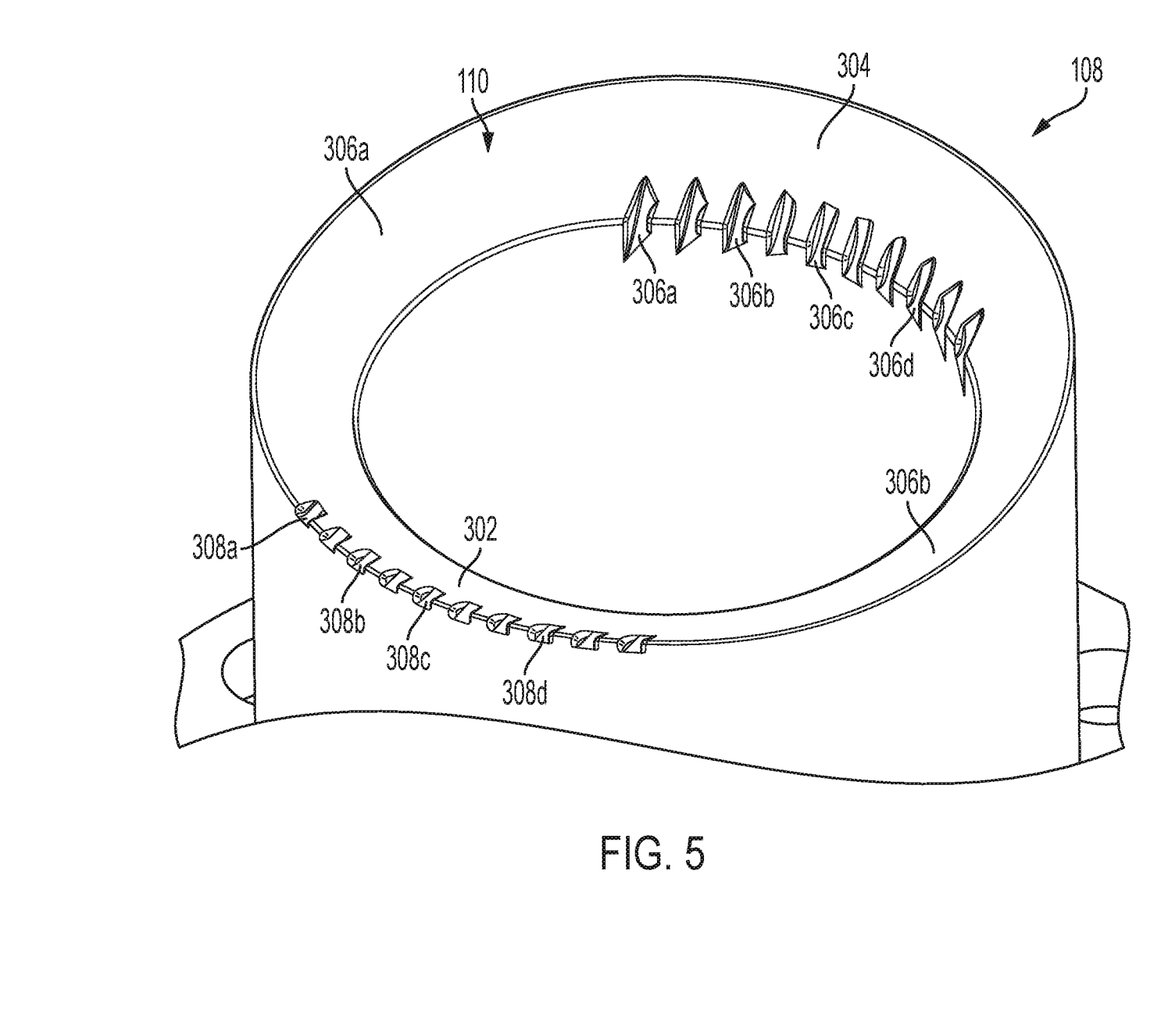
FIG. 5 is a perspective view of a seal seat, such as may be used in the example ball valve of FIG. 1, illustrating the seat geometry, according to various embodiments.

FIG. 5 depicts an example embodiment of seat 108, and specifically, contact surface 110. Similar to seal 106 on ball 104, in the depicted embodiment contact surface 110 of seat 108 includes a first section 302 and a second section 304. First section 302 and second section 304 each are arcuate in shape. First section 302 is separated from second section 304 by transition zones 306a and 306b, which are diametrically opposed (collectively or generically, transition zone 306). The angles at which each of first section 302 and second section 304 are disposed may be mirrors of the angles of first section 206 and second section 208, respectively, of seal 106, to ensure that seal 106 fully contacts and seals against contact surface 110. As with transition zones 210 of seal 106, discussed above with respect to FIG. 4, the angular transition between first section 302 and second section 304 may be gradual or relatively abrupt, the rate of transition over distance determining the size of each transition zone 306. In some embodiments, transition zone 306a may be of a different size and rate of angular change than transition zone 306b.

In the depicted embodiment, first section 302 includes a plurality of cut-outs, including cut-outs 308a, 308b, 308c, and 308d (collectively or generically, cut-out 308). The cut-outs, as may be seen, extend from an outer surface of seat 108 partially into contact surface 110 within first section 302. Similarly, second section 304, in the depicted embodiment, includes a plurality of cut-outs, including cut-outs 306a, 306b, 306c, and 306d (collectively or generically, cut-out 306). In contrast to cut-outs 308, cut-outs 306 extend from an inner surface of seat 108 partially into contact surface 110 within second section 304. Cut-outs 306 and 308 extend into their respective sections only to the extent that they are fully covered by seal 106 when ball valve 100 is in a closed position. As ball 104 rotates to an open position, seal 106 moves to uncover cut-outs 306 and 308 prior to clearing contact surface 110. As they uncover, the provide a fluid communication with cavity 124 which, in embodiments where ball valve 100 has a single seal 106 around outlet port 120, may be filled with fluid under pressure from inlet port 118. This partial release of fluid from cavity 124 into outlet port 120 may help to release pressure that may be biasing ball 104 into seat 108. The release of fluid may further assist in breaking the contact of seal 106 with contact surface 110, to help free ball 104 to fully rotate to an open position. The number and depth of cut-outs 306 and 308 may vary depending upon the needs of a given embodiment. Some embodiments may omit cut-outs 306 and/or 308.

Contact surface 110 may be formed to fully contact seal 106 when ball valve 100 is in a closed position, and to provide minimal friction to seal 106 as seal 106 moves into or out of contact with seat 108. In this way, wear of seal 106 can be minimized. In embodiments where frequent actuation of ball valve 100 is expected, where seal 106 is of a material that may impose wear upon seat 108, and/or where use conditions may result in seat 108 experiencing wear, seat 108 may be formed as a separate piece, to allow for removal and servicing or replacement. Seat 108 may be formed from metal, plastic, ceramic, composites, or any other material or combination of materials suitable for a given implementation. The choice of materials for seat 108 may be selected with respect to the choice of materials used for seal 106.

While the depicted embodiments illustrate an arrangement where seal 106 is disposed upon and retained to ball 104, it should be understood that seal 106 may instead be retained upon seat 108, with ball 104 instead carrying contact surface 110. The geometry of ball 104 and seat 108 remain unchanged in such embodiments.

Figure 6:
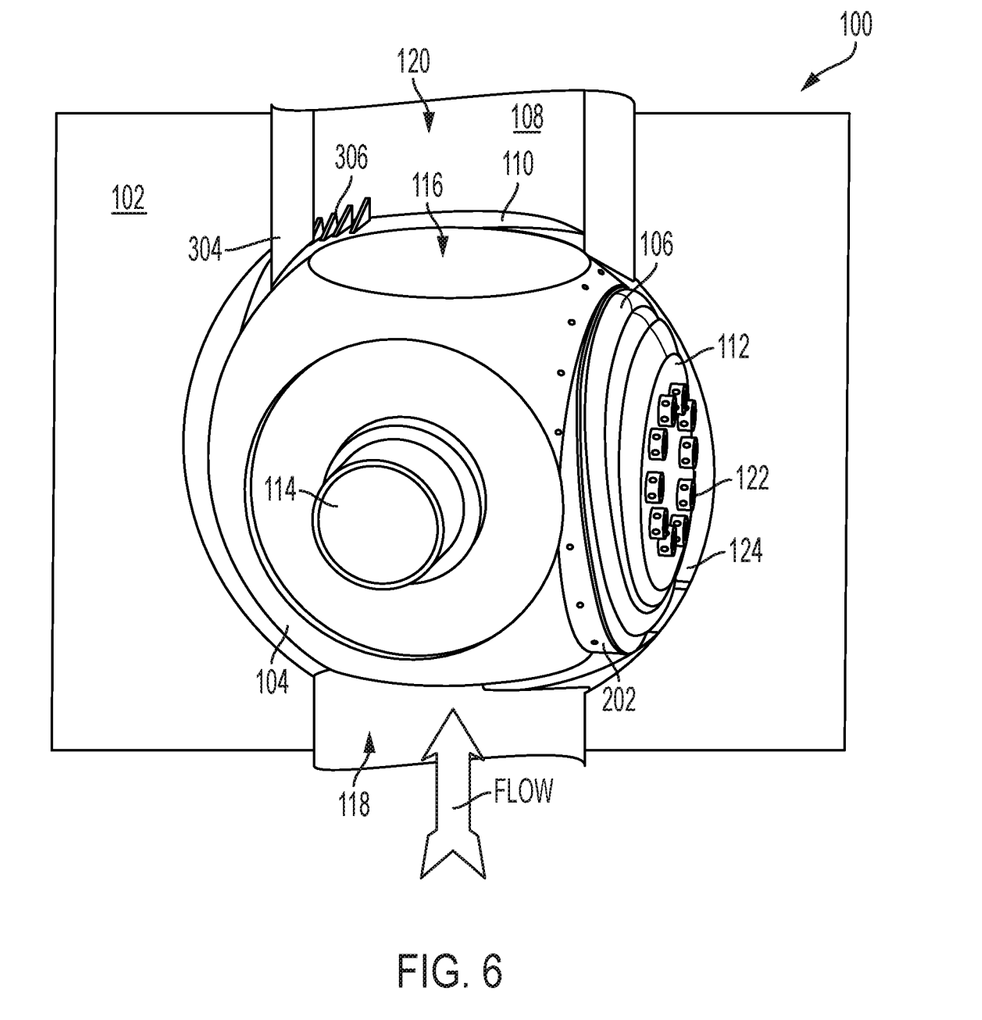
FIG. 6 is a perspective view of the ball of an example ball valve in an open configuration, with the valve body shown in cross section, illustrating the seal arrangement on the ball, according to various embodiments.
Figure 7:
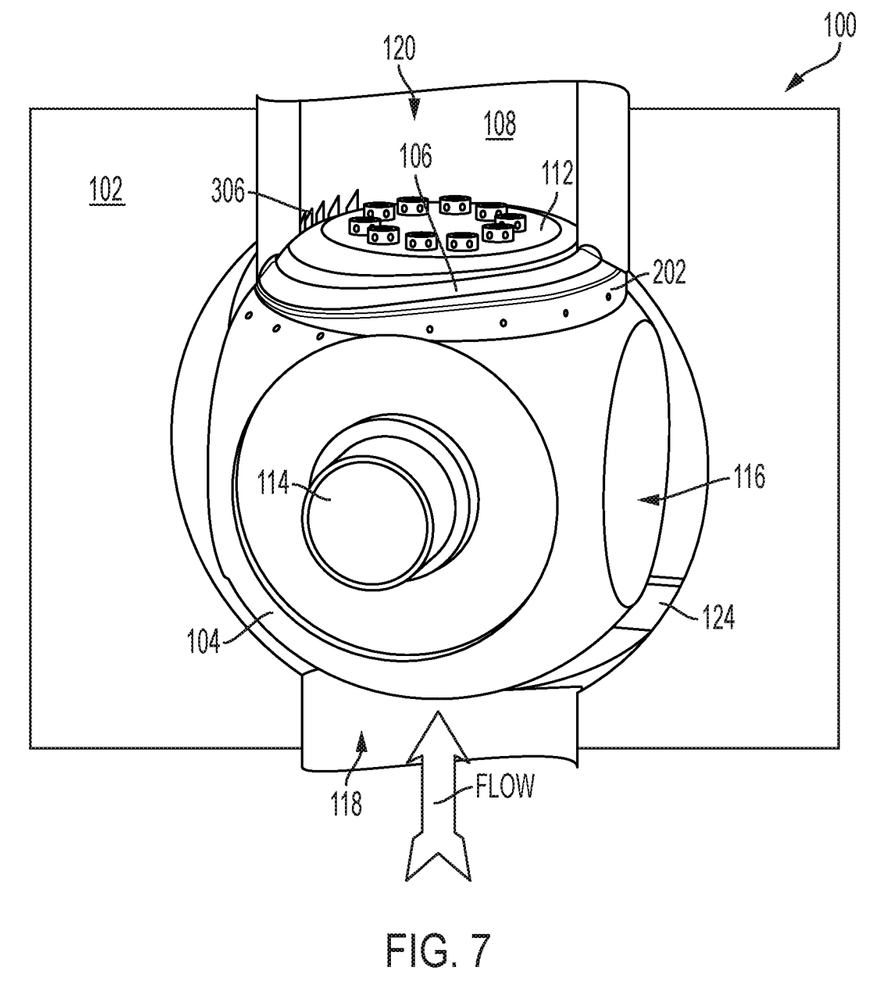
FIG. 7 is a perspective view of the ball of FIG. 4 with the example ball in a closed configuration, according to various embodiments.

Turning to FIGS. 6 and 7, ball valve 100 is depicted in perspective view of ball 104 with housing 102 in cross-section in open (FIG. 6) and closed (FIG. 7) positions, to illustrate the interface between seal 106 and contact surface 110 in open and closed positions.

Referring to the example embodiment of FIG. 6, ball 104 is illustrated in an open position. Central passageway 116 is oriented to be in line axially with inlet port 118 and outlet port 120, to provide a continuous passage for fluid from inlet port 118 to outlet port 120. Valve stem 114 is visible. Seal 106 is retained by retainer 112, and is disposed on the right hand side, facing into cavity 124. Seal 106 and retainer 112 are roughly parallel to the longitudinal axis defined by inlet port 118, central passageway 116, and outlet port 120. FIG. 2, introduced above, shows the example embodiment in cross section, clearly illustrating the fluid connection of inlet port 118, central passageway 116, and outlet port 120. As can be seen in FIG. 2, second section 304 of contact surface 110 is shown protruding into cavity 124, to eventually contact second section 208 (indicated in FIG. 6). By virtue of its extending into cavity 124 and the position of second section 208 of seal 106, second section 304 of contact surface 110 acts as a travel stop for ball 104, preventing further rotation once ball 104 is in a fully closed position. Also visible in both FIGS. 2 and 6 are cut-outs 306.

FIG. 7 illustrates the example embodiment of FIGS. 1-3 in a closed position. As can be seen, central passageway 116 is perpendicular to the axis defined by inlet port 118 and outlet port 120. Inlet port 118 opens onto ball 104, while seal 106 is engaged with contact surface 110 (not visible) of seat 108. Inlet port 118, in the depicted embodiment, is not sealed by ball 114, but instead is in fluid communication with cavity 124. This arrangement is best illustrated in FIG. 3, introduced above. Where fluid coming from inlet port 118 is under pressure, this pressure bears upon all surfaces of ball 104, including central passageway 116, behind seal 106. As the portion of ball 104, including retainer 112, that is exposed to outlet port 120 may not be under pressure, the pressure of fluid from inlet port 118 acts to bias ball 104, and thus seal 106, against seat 108, helping to improve seal function and prevent leakage.

In certain embodiments, pressurized fluid from inlet port 118 further may act to rotationally bias ball 104 to a closed position. As can be seen in FIG. 7, ridge 202, on the trailing side of seal 106 as ball 104 rotates closed, is exposed to cavity 124 when ball 104 is in or near a closed position. Conversely, the leading edge of seal 106 is protected from cavity 124 by the portion of seat 108 that extends into cavity 124, acting as a travel stop for ball 104. Because the trailing edge of seal 106 has a greater area exposed to any pressurized fluid in cavity 124 by virtue of ridge 202, as will be understood, ball 104 is biased by such fluid to rotate into a closed position, in addition to an overall bias against seat 108. As discussed above, cut-outs 306 and 308 (not shown) help to overcome this bias prior to the seal 106 clearing the contact surface 110, once seal 106 has moved a few degrees. It will be appreciated by a person skilled in the art that this rotational bias may not be present where the flow is reversed, e.g. where the outlet port 120 is pressurized relative to inlet port 118.

FIGS. 6 and 7 also depict retainer 112 affixed to ball 104, to retain seal 106. Retainer 112, as can be seen, is substantially disc-shaped in the depicted embodiment, and may include a central depression. Retainer 112 may include asymmetric features or have an asymmetric profile, to accommodate the asymmetric configuration of seal 106 and corresponding seat 108. Retainer 112 may have a different shape in different embodiments, depending upon the requirements of a given implementation. Retainer 112 may be formed from metal, plastic, ceramic, composites, or any other material or combination of materials suitable for a given implementation.

As may be understood from FIGS. 4-7, the differing angles of the corresponding first and second sections of seal 106 and contact surface 110, in embodiments, ensure that the second section 208 of seal 106 does not contact the first section 302 of contact surface 110 as the ball 104 rotates into a closed position. In embodiments, the geometry of the seal 106 and contact surface 110 of seat 108 is arranged so that the first section 206 only contacts first section 302, and the second section 208 only contacts the second section 304. In some embodiments, this contact may only occur once ball 104 is within five degrees of a fully closed position. Thus, seal 106 only is subject to friction or wear for approximately five degrees of travel to or from a fully closed position. Once past approximately five degrees of travel, seal 106 does not contact any other structures within ball valve 100, helping to preserve seal life. Other embodiments may limit contact to more or less than five degrees of a fully closed position, depending upon the particular angles employed for seal 106 and contact surface 110.

Figure 8:
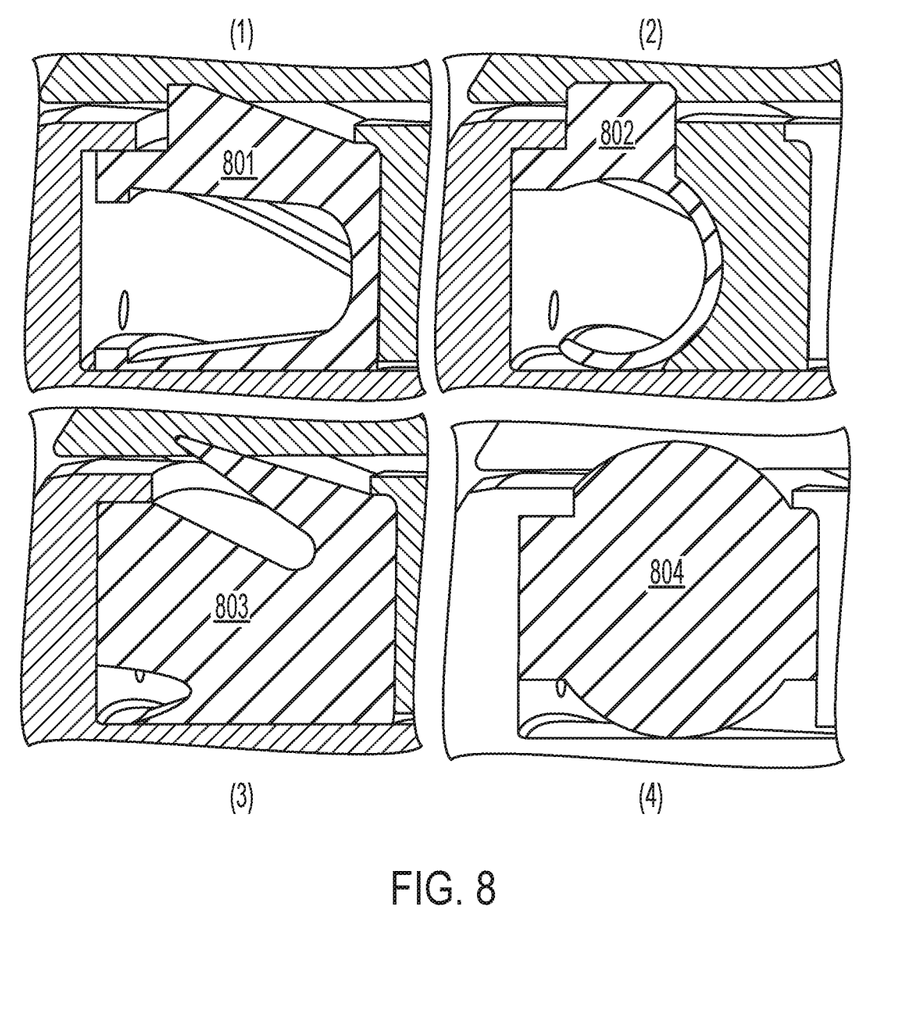
FIG. 8 is a series of cross-sectional views of various seals, illustrating different possible embodiments of the seal.

Referring now to FIG. 8, example embodiments of the seal are depicted in cross section. In cross section (1), seal 801 has a U-shaped cross section, with an angular protrusion forming the sealing surface. A spring mechanism (not shown) may be placed within the U-shaped groove to help bias seal 801 towards a contact surface. The angular formation of seal 801 may enhance wiping of the contact surface to help keep the surface clear of debris that may interfere with seal integrity. In cross section (2), seal 802 has a C-shaped cross section, with a rectangular protrusion forming the sealing surface. As with seal 801, a spring mechanism may be placed within the C-shaped cross section to help bias seal 802 towards a contact surface. The rectangular protrusion likewise may help with wiping of the contact surface, and further may provide a better seal against the contact surface due to the greater surface area presented by the rectangular protrusion, albeit as the expense of potentially greater effort required to close or open the ball valve 100 from a fully closed position. In cross section (3), seal 803 is substantially solid, with a blade protrusion extending away from a channel. As with seal 801, the blade protrusion may provide superior wiping action of a contact surface, with the underlying channel helping to trap any contaminants or debris. However, seal 803's improved wiping action may come at the expense of a greater seal integrity, and so seal 803 may be unable to withstand the same amount of pressure as another seal configuration. Finally, cross section (4) illustrates a seal 804 with a substantially round cross section, similar to the configuration of seal 106 discussed above. A round cross section may offer the greatest ease in moving ball 104 to or from a fully closed position, at the expense of reduced wiping action against the contact surface. These four seals 801, 802, 803, and 804 are only a few examples; other seal configurations may be employed in various embodiments, depending upon the needs of a given configuration.

It should be recognized that each of the four seals 801, 802, 803, and 804, may be useable with ball 104 and potentially retainer 112, as discussed above. A given ball valve 100 may be reconfigured with a different type of seal by removal of the retainer 112, and swapping the seal. In some cases, such as seal 802, an additional shim or similar support may be added to adapt the seal to retainer 112, or retainer 112 may be swapped for a retainer designed to accommodate seal 802. Other seal configurations may also be useful with ball valve 100, potentially by simply swapping retainer 112. In still other embodiments, seal configurations may also be changed by swapping out seat 108, if it is removable from housing 102. In such embodiments, the geometry and sealing characteristics of a given ball valve 100 may be adapted to a wide array of uses by configuring the ball valve 100 with the appropriate seal 106, seat 108, and retainer 112.

Seal 106, 801, 802, 803, and/or 803 may be manufactured from an elastomeric material, to allow the seal to conform closely to contact surface 110. In other embodiments, however, the seal may be manufactured from relatively more rigid materials, such as metal, ceramic, composite, or another suitable material or combination of materials, depending upon the requirements of the intended use of a given embodiment. Furthermore, the seal may be installed using an additive or machine in place process. Raw seal material may be placed upon ball 104 and retained with retainer 112. The seal material may then be machined in place to closely match the profile of the contact surface 110. In some such implementations, precise measurements of contact surface 110 may be obtained, and then used via a CNC process to create a seal that accurately fits to contact surface 110. Such a process may be of particular use where contact surface 110 has undergone a degree of wear such that it has drifted from its original specifications sufficiently that a seal conforming to original specifications may not be able to fully seal, or provide an adequate seal, to the contact surface 110 when the ball is in a fully closed position.

As mentioned above, in other embodiments the seal 106 may be secured to the seat 108, with the contact surface 110 secured to the ball 104. In such embodiments, the seal 106 may be installed in raw form to seat 108, which can then be machined in place to match the contact surface 110 secured to ball 104.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A method for constructing a ball valve, comprising:
   disposing a seal seat within a valve housing; and
   retaining, upon a rotating ball contained within the valve housing, a non-planar seal comprising a first section and second section separated by a first intervening transition zone, wherein the first section of the non-planar seal is oriented at a different angle than the second section of the non-planar seal such that the seal defines at least two planes,
   wherein the seal seat and non-planar seal are oriented so that the first section and second section of the seal fully contact a mating surface of the seal seat when the ball valve is in a closed position, and wherein the non-planar seal does not contact a portion of the mating surface of the seal seat when the ball valve is in an open position, wherein the first section, the second section, and the first intervening transition zone collectively create a twist in the non-planar seal.

2. The method of claim 1, further comprising orienting the first section of the non-planar seal at a first acute angle relative to a first axis oriented tangentially to an outer surface of the rotating ball.

3. The method of claim 2, further comprising orienting the second section of the non-planar seal at a second acute angle relative to a second axis oriented tangentially to an outer surface of the rotating ball, wherein the second acute angle is greater than the first angle.

4. A ball valve, comprising:
   an non-planar seal disposed circumferentially upon a rotating ball, wherein the rotating ball and the seal are contained within a housing, wherein the non-planar seal comprises a first section and a second section separated by a first intervening transition zone, and wherein the first section is oriented at a different angle than the second section such that the seal defines at least two planes; and a mating surface disposed within the housing adjacent to the rotating ball, wherein the mating surface is arranged to fully contact the seal when the ball valve is in a closed position, wherein the seal and the mating surface are the first section of the seal the second section of the mating surface when the rotating ball is rotated between a closed position and an open position, wherein the first section, the second section, and the first intervening transition zone collectively create a twist in the non-planar seal.

5. The ball valve of claim 4, wherein the first section and the second section each comprise an arcuate portion of the non-planar seal.

6. The ball valve of claim 5, wherein a first end of the arcuate portion of the first section is separated from a first end of the arcuate portion of the second section by the first intervening transition zone.

7. The ball valve of claim 6, wherein the first intervening transition zone is oriented at a different angle than the first section and the second section.

8. The ball valve of claim 6, wherein a second end of the arcuate portion of the first section is separated from a second end of the arcuate portion of the second section by a second intervening transition zone.

9. The ball valve of claim 8, wherein the first intervening transition zone is diametrically opposed the second intervening transition zone.

10. The ball valve of claim 4, wherein the first section of the non-planar seal is oriented at a first acute angle relative to a first axis oriented tangentially to an outer surface of the rotating ball.

11. The ball valve of claim 10, wherein the first axis is a direction of travel of the rotating ball.

12. The ball valve of claim 10, wherein the second section of the non-planar seal is oriented at a second acute angle relative to a second axis oriented tangentially to an outer surface of the rotating ball.

13. The ball valve of claim 12, wherein the second acute angle is greater than the first angle.

14. A ball valve, comprising:

an arcuate seal disposed circumferentially upon a rotating ball, wherein the rotating ball and the seal are contained within a housing, wherein the arcuate seal comprises a first section and a second section separated by a first intervening transition zone, and wherein the first section is oriented at a different angle than the second section such that the seal defines at least two planes; and a mating surface disposed within the housing adjacent to the rotating ball, wherein the mating surface is arranged to fully contact the seal when the ball valve is in a closed position, wherein the seal and the mating surface are oriented such that the seal does not contact the mating surface when the rotating ball is rotated between a closed position and an open position, wherein the first section, the second section, and the first intervening transition zone collectively create a twist in the non-planar seal.

15. The ball valve of claim 14, wherein a first end of the first section is separated from a first end of the second section by the first intervening transition zone.

16. The ball valve of claim 15, wherein the first intervening transition zone is oriented at a different angle than the first section and the second section.

17. The ball valve of claim 15, wherein a second end of the first section is separated from a second end of the second section by a second intervening transition zone.

18. The ball valve of claim 17, wherein the first intervening transition zone is diametrically opposed the second intervening transition zone.

* * * * *